F. B. MORSE.
Dies for Swaging Carriage-Clips.
No. 5,826. Reissued April 7, 1874.
fig. 1
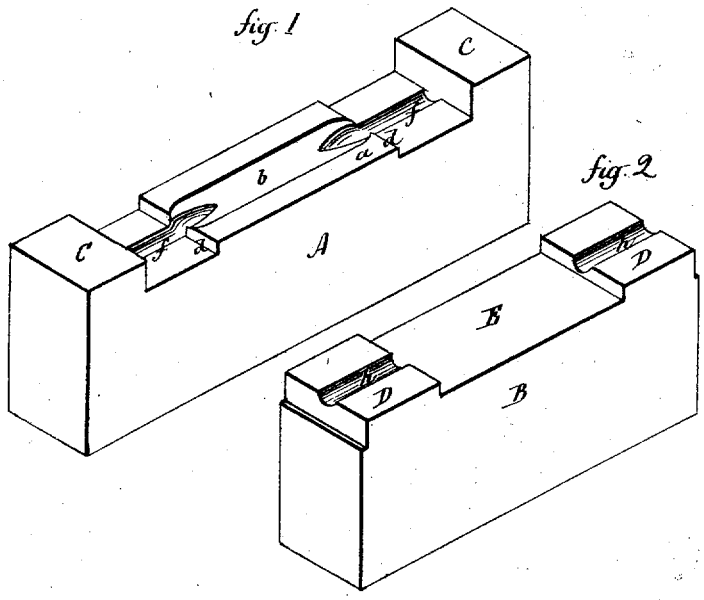
fig. 2
fig. 3.
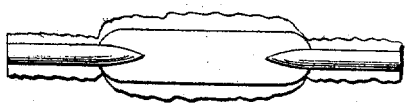
fig. 4
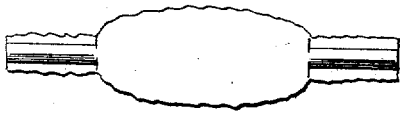
fig. 5
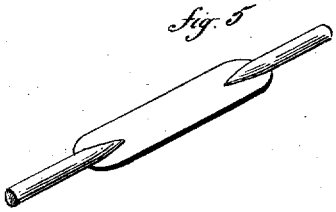
Witnesses
J. H. Shumway
A. J. Tibbits
H. D. Smith & Co.,
Assignees of Francis B. Morse
Inventor
By atty.
Wm. E. Earle
A.M. PHOTO-LITHOGRAPHIC Co. N.Y. (OSBORNE'S PROCESS.)

UNITED STATES PATENT OFFICE.

H. D. SMITH & CO., OF PLANTSVILLE, CONNECTICUT, ASSIGNEES OF FRANCIS B. MORSE.

IMPROVEMENT IN DIES FOR SWAGING CARRIAGE-CLIPS.

Specification forming part of Letters Patent No. 108,283, dated October 11, 1870; reissue No. 5,826, dated April 7, 1874; application filed March 23, 1874.

*To all whom it may concern:*

Be it known that FRANCIS B. MORSE, deceased, late of Plantsville, in the county of Hartford and State of Connecticut, did invent a new Improvement in Dies for Swaging Carriage-Clips; and we do hereby declare the following, when taken in connection with the accompanying drawings and the letters of reference marked thereon, to be a full, clear, and exact description of the same, and which said drawings constitute part of this specification, and represent, in—

Figure 1, a perspective view of the lower part of the die; Fig. 2, a perspective view of the upper part of the die; Figs. 3 and 4, reverse sides of the clip as it comes from the die; and in Fig. 5 the clip after being trimmed.

This invention relates to an improvement in forging the articles of manufacture known to the trade as carriage-clips.

Great difficulty has been experienced in the process of forging these articles to throw the metal so as to make a perfect construction at the intersection of the bolt ends with the body, and various devices to overcome this difficulty have been resorted to. By this invention this difficulty is entirely overcome; and it consists in forming the lower die with a shoulder or recess at each end at the point or intersection of the bolt and body part of the clip, and the upper die constructed so as to correspond to the lower die; also, in combining therewith a buttress at each end of one part of the die to prevent the extension of the blank in the striking up.

A is the lower, and B the upper, die. In the central portion *a* of the lower die a cavity, *b*, is formed corresponding to the shape of the body of the clip, and at the end of the said central portion, which is the length of the body of the clip, a drop or shoulder, *d*, is formed, in which a cavity, *f*, corresponding to one-half of the bolt, is formed, the said cavity running up and dying out in the cavity *b*. The upper die is constructed, accordingly, with a projection, D, at each end, having cavities *h* formed therein corresponding to the other half of the bolt. The central portion E is sunk corresponding to the central portion *a* of the lower die, so that the two dies will set together. In order to prevent any longitudinal extension of the blank in the striking up, a buttress, C, is formed at each end of one part, as seen in Fig. 1.

Take a blank of sufficient diameter to allow the necessary metal for the formation of the clip, and cut the length required, so as to drop in between the two buttresses C C. This, heated and placed in the die, and the upper part B struck thereon, is formed corresponding to the shape of the die, and the bolt part, owing to the shoulders *d*, is struck clear and distinct from the body, as denoted in Fig. 5, insuring a perfect formation of both the clip and bolt.

The buttresses prevent the elongation of the metal in the process of striking up, and, therefore, practically upset the metal, just so much as it would naturally elongate were the buttresses not present to support the ends. These buttresses, one or both, may be made adjustable or attached to the die in any desirable manner, yet it is preferable to form them a part of the die.

The article, as it comes from the die, is represented, the lower side as in Fig. 3, and the upper side as in Fig. 4. These presented to the trimming-dies, the surplus metal is cut away, leaving the clip finished, as in Fig. 5, and this is done without previously upsetting.

We claim as the invention of the said FRANCIS B. MORSE—

1. The dies for forging carriage-clips, consisting of two parts, the first of which is constructed with a cavity, *b*, corresponding to the shape of the body of the clip, and with a recess or shoulder, *d*, at each end of said cavity, and a cavity, *f*, in each of said recesses *d*, corresponding to one longitudinal half of the bolt, and the second part with a projection, D, at each end, corresponding to the recesses or shoulders *d* in the first part, each of said projections constructed with a cavity, *h*, corresponding to the other half of the bolt, the central portion E of the second part corresponding to the central portion *a* of the first part, all substantially as described.

2. In dies for forging carriage-clips consisting of two parts, the first of which is constructed with a cavity, *b*, corresponding to the shape of the body of the clip, and with a recess or shoulder, *d*, at each end of said cavity, and a cavity, *f*, in each of said recesses *d*, corresponding to one longitudinal half of the bolt, and the second part with a projection, D, at each end, corresponding to the recesses or shoulders *d* in the first part, each of said projections constructed with a cavity, *h*, corresponding to the other half of the bolt, the central portion E of the second part corresponding to the central portion *a* of the first part, the buttress C at each end of one part, substantially as and for the purpose specified.

H. D. SMITH & CO.,
By GEO. F. SMITH,
*And of the firm of H. D. Smith & Co.*

Witnesses:
A. J. TIBBITS,
J. H. SHUMWAY.